(12) United States Patent
Wang et al.

(10) Patent No.: US 12,515,747 B2
(45) Date of Patent: Jan. 6, 2026

(54) EXCAVATOR LOWER PART LENGTH REGULATING SYSTEM AND EXCAVATOR

(71) Applicant: SHANGHAI SANY HEAVY MACHINERY CO., LTD., Shanghai (CN)

(72) Inventors: Xiao Wang, Shanghai (CN); Jinmei Yao, Shanghai (CN)

(73) Assignee: SHANGHAI SANY HEAVY MACHINERY CO., LTD., Shanghai (CN)

( * ) Notice: Subject to any disclaimer, the term of this patent is extended or adjusted under 35 U.S.C. 154(b) by 360 days.

(21) Appl. No.: 17/928,925

(22) PCT Filed: Feb. 24, 2022

(86) PCT No.: PCT/CN2022/077680
§ 371 (c)(1),
(2) Date: Nov. 30, 2022

(87) PCT Pub. No.: WO2022/267505
PCT Pub. Date: Dec. 29, 2022

(65) Prior Publication Data
US 2024/0217598 A1 Jul. 4, 2024

(30) Foreign Application Priority Data

Jun. 23, 2021 (CN) .......................... 202110697550.3

(51) Int. Cl.
*B62D 55/084* (2006.01)
*B62D 55/092* (2006.01)
*B62D 55/30* (2006.01)

(52) U.S. Cl.
CPC ......... *B62D 55/084* (2013.01); *B62D 55/092* (2013.01); *B62D 55/30* (2013.01)

(58) Field of Classification Search
CPC ..... B62D 55/082; B62D 55/094; B62D 55/30
USPC ........................................................ 180/9.52
See application file for complete search history.

(56) References Cited

U.S. PATENT DOCUMENTS

| 2012/0103704 A1* | 5/2012 | Beasley ............... B62D 55/305 180/9.1 |
| 2015/0008728 A1* | 1/2015 | Davis .................. B62D 55/112 305/131 |
| 2019/0135356 A1* | 5/2019 | Obermeier-Hartmann .................. B62D 55/30 |

FOREIGN PATENT DOCUMENTS

| CN | 201371870 Y | 12/2009 |
| CN | 102425193 A | 4/2012 |

(Continued)

OTHER PUBLICATIONS

First Office Action for Counterpart Chinese Patent Application No. 202110697550.3, Issued Jan. 24, 2022, 12 pages (including 6 page English translation).

(Continued)

*Primary Examiner* — Valentin Neacsu
*Assistant Examiner* — Morgan Knauf
(74) *Attorney, Agent, or Firm* — WOMBLE BOND DICKINSON (US) LLP

(57) ABSTRACT

The present application relates to the technical field of construction machinery, in particular to an excavator lower part length regulating system and an excavator. The excavator lower part length regulating system includes: a lower part walking beam; a caterpillar track, provided around the lower part walking beam; and a regulating assembly, adapted to regulating the length of the lower part walking beam and the height of the caterpillar track along a longitudinal direction. The regulating assembly has an extension state in which the lower part walking beam is driven to be elongated and the caterpillar track is driven to descend along (Continued)

a longitudinal direction, and a contraction state in which the lower part walking beam is driven to be shortened and the caterpillar track is driven to ascend along the longitudinal direction. The present application provides the excavator lower part length regulating system, which regulates the length of the lower part walking beam and concomitantly regulates the height of the caterpillar track along the longitudinal direction by providing the regulating assembly, to realize an adaptive regulation of the caterpillar track with a constant perimeter, overcome the defect that the traditional excavator fails to regulate the ground pressure; and provide the excavator capable of regulating the ground pressure according to requirements.

7 Claims, 4 Drawing Sheets

(56) References Cited

FOREIGN PATENT DOCUMENTS

| CN | 102425193 | B | * | 6/2013 | | |
|----|-----------|---|---|--------|---|---|
| CN | 106641753 | A | | 5/2017 | | |
| CN | 206407008 | U | | 8/2017 | | |
| CN | 107618581 | A | | 1/2018 | | |
| CN | 108238121 | A | * | 7/2018 | ............. | A01D 67/00 |
| CN | 207773293 | U | | 8/2018 | | |
| CN | 108860341 | A | | 11/2018 | | |
| CN | 213109551 | U | | 5/2021 | | |
| CN | 113247127 | A | | 8/2021 | | |
| JP | H1045060 | A | | 2/1998 | | |
| JP | 10218044 | A | * | 8/1998 | | |

OTHER PUBLICATIONS

Z. Song, C. Wang & L.Cao, "Fluid SIM Modeling and Simulation of Hydraulic Transmission and Control," Eds. China Machine Press, 1st Edition, pp. 76-78 (Beijing, China May 31, 2020)(including English abstract).

Z. Jin, Excavators—"Principles, Testing and Repair," Golden China, Phai Delivery, pp. 324-327, Shanghai Jiao Tong University Press, 1st Edition (Mar. 31, 2011)(including English abstract).

First Search Report for Counterpart Chinese Patent Application No. 202110697550.3, dated Jan. 24, 2022, 2 pages.

* cited by examiner

EXCAVATOR LOWER PART LENGTH REGULATING SYSTEM AND EXCAVATOR

CROSS-REFERENCE TO RELATED APPLICATIONS

The present application is a US national phase application under 35 USC Section 371 of International Application No. PCT/CN2022/077680, filed Feb. 24, 2022, and claims priority to Chinese Application No. CN202110697550.3 filed on Jun. 23, 2021, entitled "Excavator Lower Part Length Regulating System and Excavator", which was incorporated by reference in the entirety.

TECHNICAL FIELD

The present application relates to the technical field of construction machinery, in particular to an excavator lower part length regulating system and an excavator.

BACKGROUND

In related art, a walking unit of an excavator is generally in a form of caterpillar track. By adopting the form of caterpillar track, a contact area between the bottom of the excavator and the ground can be effectively ensured, to obtain a smaller ground pressure, so that the excavator can be operated under different working conditions. Although there is a smaller ground pressure when the excavator is in the form of caterpillar track, when the excavator is operated on loose ground, if an operation height is increased or other functional appliances are added, the chassis lower part may be unstable. However, the traditional excavator does not have a more suitable form to further reduce the ground pressure and fails to ensure the stability and adaptability of the excavator.

SUMMARY

The problem to be solved in the present application is to overcome a defect that a traditional excavator fails to regulate the ground pressure, and then provide an excavator lower part length regulating system capable of regulating the ground pressure according to requirements.

Another problem to be solved in the present application is to overcome the defect that a traditional excavator fails to regulate the ground pressure, and then provide an excavator capable of regulating the ground pressure according to the requirements.

In order to solve the above-mentioned problem, the present application provides an excavator lower part length regulating system, including:
a lower part walking beam;
a caterpillar track, provided around the lower part walking beam; and
a regulating assembly, adapted to regulating the length of the lower part walking beam and concomitantly regulating the height of the caterpillar track along a longitudinal direction,
where the regulating assembly has an extension state in which the lower part walking beam is driven to be elongated and the caterpillar track is driven to descend along the longitudinal direction, and a contraction state in which the lower part walking beam is driven to be shortened and the caterpillar track is driven to ascend along the longitudinal direction.

In an embodiment, the lower part walking beam includes:
a fixed walking beam; and
a telescopic walking beam sleeved and connected to the fixed walking beam,
where the telescopic walking beam is adapted to performing telescopic movement relative to the fixed walking beam under a driving of the regulating assembly.

In an embodiment, the regulating assembly includes:
a telescopic rod, adapted to performing telescopic movement along a first direction;
a sliding rod, provided along a second direction, and an included angle A is formed between the sliding rod and the first direction, where the A>0°;
a sliding block, sleeved on the sliding rod and adapted to sliding along the second direction; and
a connecting rod, where an end of the connecting rod is hinged with the telescopic rod and another end of the connecting rod is hinged with the sliding block,
where the telescopic rod is adapted to driving the sliding block to descend along the second direction through the connecting rod when the telescopic rod performs extending movement along the first direction; and the telescopic rod is adapted to driving the sliding block to ascend along the second direction through the connecting rod when the telescopic rod performs contracting movement along the first direction.

In an embodiment, the regulating assembly further includes:
a following rod, fixedly connected with the sliding block, and adapted to following the lifting of the sliding block to perform lifting movement,
where an end of the following rod is connected to a carrier wheel, and the carrier wheel is adapted to holding the caterpillar track.

In an embodiment, the telescopic rod is fixedly connected to or hinged with the telescopic walking beam; and
the telescopic rod moving along the first direction is adapted to driving the telescopic walking beam to perform telescopic movement relative to the fixed walking beam.

In an embodiment, the excavator lower part length regulating system further includes: a following supporting wheel, connected to the telescopic walking beam and adapted to moving with the movement of the telescopic walking beam.

In an embodiment, the fixed walking beam is provided with at least one pipeline channel on a section perpendicular to its length direction, and the pipeline channel is adapted to arranging a pipeline.

In an embodiment, inside of the fixed walking beam is provided with a telescopic cavity, and the telescopic cavity is matched with the shape of the telescopic walking beam and is adapted to guiding the movement of the telescopic walking beam;
the section of the telescopic walking beam is X-shaped or cross-shaped.

In an embodiment, an upper end and a lower end of the fixed walking beam are provided with an upper lubrication passage and a lower lubrication passage respectively, where the upper lubrication passage is communicated with an upper part of the telescopic cavity, the lower lubrication passage is communicated with a lower part of the telescopic cavity, and the upper lubrication passage and the lower lubrication passage are communicated through a lubrication pipe.

An excavator provided by the present application includes:
- a rotating platform, an operating room, a working arm, and a lower part frame; and
- the above-mentioned excavator walking part length regulating system provided on the lower part frame.

The solutions of the present application have the following beneficial effects.

1. The excavator lower part length regulating system provided by the present application, provides the regulating assembly to regulate the length of the lower part walking beam and concomitantly regulate the height of the caterpillar track along a longitudinal direction to realize an adaptive regulation of the caterpillar track with a constant perimeter. In addition, the regulating assembly has an extension state in which the lower part walking beam is driven to be elongated and the caterpillar track is driven to descend along the longitudinal direction, and the contraction state in which the lower part walking beam is driven to be shortened and the caterpillar track is driven to ascend along the longitudinal direction, to elongate the length of the lower part and reduce the ground pressure for ensuring stability when needed, and to shorten the excavator lower part length to an initial length for regulating the length of the lower part when not needed.

2. The excavator lower part length regulating system provided by the present application, provides the telescopic walking beam which performs telescopic movement relative to the fixed walking beam under the driving of the regulating assembly, to regulate the length of the walking part and reduce the ground pressure to ensure stability.

3. The excavator lower part length regulating system provided by the present application, provides the following rod of the regulating assembly whose end is connected to the carrier wheel for holding the caterpillar track, to support the caterpillar track along longitudinal direction, and regulate the caterpillar track to ascend or descend along the longitudinal direction when the following rod is performing lifting movement following the lifting movement of the sliding block, for ensuring that the caterpillar track is always in a tension state.

4. The excavator lower part length regulating system provided by the present application, provides the following supporting wheel to move with the movement of the telescopic walking beam, to make the following supporting wheel to move along when a driving wheel is shifted after the length of the lower part is increased, for ensuring the tension of a part below the driving wheel and the caterpillar track.

5. The excavator lower part length regulating system provided by the present application, provides the fixed walking beam with at least one pipeline channel provided on the section perpendicular to its length direction, to reasonably arrange one or more pipelines for preventing the pipelines from wear during operating, and ensuring the cleanliness of overall appearance.

6. The excavator lower part length regulating system provided by the present application, provides the upper end and the lower end of the fixed walking beam with the upper lubrication passage and the lower lubrication passage respectively, and the upper lubrication passage and the lower lubrication passage are communicated through a lubrication pipe, to extrude a grease through a X sliding rod. Since most of the grease deposited below due to gravity is squeezed to an upper part from a bottom of the channel, and returns to the upper part for lubrication, a cycle is formed to ensure good lubrication in the channel.

7. The excavator provided by the present application, provides the excavator lower part length regulating system to regulate the length of the lower part, and overcomes the defect that the traditional excavator fails to regulate the ground pressure by regulating the length of the lower part, and provides the excavator capable of regulating the ground pressure according to the needs to increase the stability of the excavator during operating.

BRIEF DESCRIPTION OF DRAWINGS

In order to more clearly illustrate the solutions according to the embodiments of the present application or the prior art, the accompanying drawings used in the description of the embodiments or the prior art will be briefly introduced below. It should be noted that the drawings in the following description are a part of embodiments of the present application. For those of ordinary skill in the art, other drawings can also be obtained according to these drawings without creative efforts.

REFERENCE NUMERALS

Figure 1:
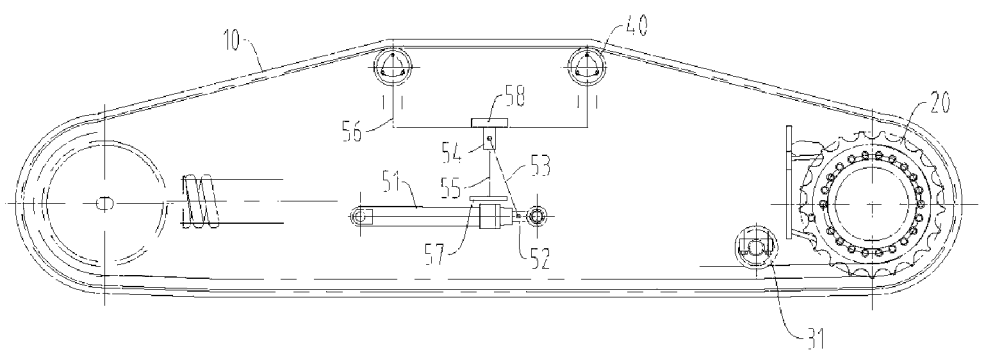
FIG. 1 is a schematic diagram of an excavator lower part length regulating system in a contraction state.
Figure 2:
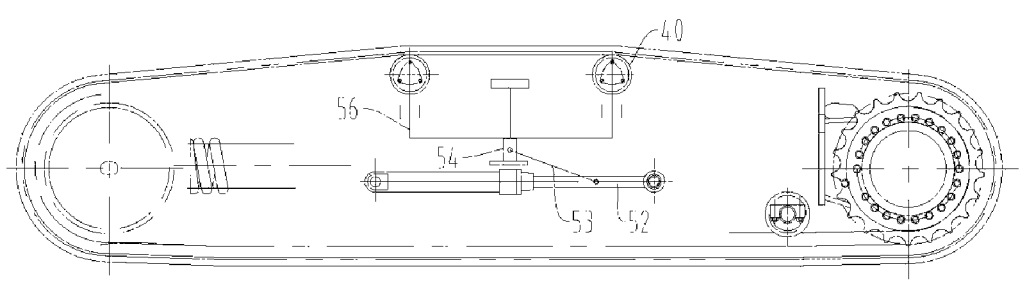
FIG. 2 is a schematic diagram of an excavator lower part length regulating system in an extension state.

10: caterpillar track; 20: driving wheel; 31 following supporting wheel; 32: fixed supporting wheel; and 40: carrier wheel;

50: regulating assembly; 51: telescopic cylinder; 52: telescopic rod; 53: connecting rod; 54: sliding block; 55: sliding rod; 56: following rod; 57: lower limiting portion; and 58: upper limiting portion;

60: lower part frame; 61: fixed walking beam; 62: telescopic walking beam; 63: sheath; 64: telescopic cavity; 65: lower lubrication passage; 66: upper lubrication passage; 67: lubrication pipe; 68: pipeline channel; 69: main bracket;

80: walking motor; 81: pipeline.

DETAILED DESCRIPTION OF THE EMBODIMENTS

The solutions of the present application will be clearly and completely described below in combination with the accompanying drawings of the present application. It should be noted that, the described embodiments are a part of embodiments of the present application, rather than all the embodiments. Based on the embodiments of the present application, all other embodiments obtained by those of ordinary skill in the art without creative effort fall within the scope of protection of the present application.

In the description of the present application, it is to be noted that, the orientation or positional relations specified by terms such as "central", "upper", "lower", "left", "right", "vertical", "horizontal", "inner", "outer" and the like, are based on the orientation or positional relations shown in the drawings, which is merely for convenience of description of the present application and to simplify description, but does not indicate or imply that the stated devices or components must have the particular orientation and be constructed and operated in a particular orientation, and thus it is not to be construed as limiting the present application. Furthermore, the terms "first", "second", "third" and the like are only used for descriptive purposes and should not be construed as indicating or implying a relative importance.

In the description of the present application, it is to be noted that unless explicitly specified and defined otherwise, the terms "install", "connected to" and "connected" shall be understood broadly, for example, it may be either fixedly connected or detachably connected, or can be integrated; it may be either mechanically connected, or electrically connected; it may be either directly connected, or indirectly connected through an intermediate medium; or it may be either a communication between two components. The specific meanings of the terms above in the present application can be understood by a person skilled in the art in accordance with specific conditions.

In addition, the features involved in different embodiments described below can be combined as long as the features are not conflict to each other.

Embodiment One

An excavator lower part length regulating system provided by this embodiment, including:
 a lower part walking beam;
 a caterpillar track 10, provided around the lower part walking beam; and
 a regulating assembly 50, adapted to regulating the length of the lower part walking beam and concomitantly regulating the height of the caterpillar track 10 along a longitudinal direction,
 where the regulating assembly 50 has an extension state in which the lower part walking beam is driven to be elongated and the caterpillar track 10 is driven to descend along the longitudinal direction, and a contraction state in which the lower part walking beam is driven to be shortened and the caterpillar track 10 is driven to ascend along the longitudinal direction.

It should be noted that the lower part walking beam is an important part of an excavator walking device, and symmetrically provided on both sides of a bottom of the excavator for installing a walking motor 80, drives the caterpillar track 10 to walk through a driving wheel 20, and bears a main load of the excavator. The caterpillar track 10 is provided around the lower part walking beam and directly contacted with the ground. Under a condition that an overall load of the excavator is constant, the contact area between the caterpillar track and the ground directly affects the ground pressure. The ground pressure refers to a vertical load on a unit area of an object contacting with the ground. The ground pressure is an important parameter in engineering field and directly associated with the stability of a machinery in a moving process. For example, the smaller the ground pressure, the better the stability; and the greater the ground pressure, the worse the stability.

In an embodiment, the excavator lower part length regulating system further includes: a driving wheel 20, provided on an end of the lower part walking beam, and adapted to driving the caterpillar track 10 to move.

In an embodiment, the caterpillar track 10 is constructed as a ring structure connected end to end, and the length of the caterpillar track 10 around the lower part walking beam is a fixed value. As shown in FIG. 1, the caterpillar track 10 encircles the driving wheel 20 and a driven wheel, and the caterpillar track 10 is lifted by the carrier wheel 40. When the center distance between the driving wheel 20 and the driven wheel is a fixed value, the lifting height of the carrier wheel 40 to the caterpillar track 10 is also a fixed value. When the center distance between the driving wheel 20 and the driven wheel is a variable value, the lifting height of the carrier wheel 40 to the caterpillar track 10 is also a variable value.

During operating, according to the needs of the operating conditions, when the ground pressure needs to be reduced, the regulating assembly 50 is in an extension state, that is, the length of the lower part walking beam is regulated to be extended, to increase the length of the contact between the caterpillar track 10 and the ground by driving the driving wheel 20 to move, that is, the contact area between the caterpillar track 10 and the ground is increase to reduce the ground pressure and increase the stability. In addition, the height of the caterpillar track 10 is regulated concomitantly by the regulating assembly to reduce along the longitudinal direction, to realize an adaptive regulation of the caterpillar track 10 with a constant perimeter. When the ground pressure does not need to be reduced, the regulating assembly 50 is in a construction state, that is, the length of the lower part walking beam is regulated to be shortened to an initial length, the driving wheel 20 returns to an initial position, and the length of the contact between the caterpillar track 10 and the ground is shortened to an initial length, and at the same time, the height of the caterpillar track 10 is regulated concomitantly by the regulating assembly to increase along the longitudinal direction, to realize an adaptive regulation of the caterpillar track 10 with a constant perimeter.

The excavator lower part length regulating system provided by this embodiment, provides the regulating assembly 50 to regulate the length of the lower part walking beam and regulate concomitantly the height of the caterpillar track 10 along the longitudinal direction to realize an adaptive regulation of the caterpillar track 10 with a constant perimeter. In addition, the regulating assembly 50 has the extension state in which the lower part walking beam is driven to be elongated and the caterpillar track 10 is driven to descend along the longitudinal direction, and the contraction state in which the lower part walking beam is driven to be shortened and the caterpillar track 10 is driven to ascend along the longitudinal direction, to elongate the length of the lower part and reduce the ground pressure to ensure the stability when it is needed, and to shorten the lower part length to an initial length for regulating the walking part length when it is not needed.

In an embodiment, the lower part walking beam includes:
 a fixed walking beam 61; and
 a telescopic walking beam 62 sleeved and connected to the fixed walking beam 61,
 where the telescopic walking beam 62 is adapted to performing telescopic movement relative to the fixed walking beam 61 under the driving of the regulating assembly 50.

In an embodiment, the lower part walking beam further includes: a telescopic cavity 64, adapted to guiding the movement of the telescopic walking beam 62.

When the regulating assembly 50 is in the extension state, the telescopic walking beam 62 slides within the telescopic cavity 64, and performs extending movement relative to the fixed walking beam 61, and then the length of the lower part is increased, and the contact area between the caterpillar track 10 and the ground is increased, to reduce the ground pressure and increase the stability.

In an embodiment, the lower part walking beam further includes: a sheath 63, provided on an end of the telescopic walking beam 62 away from the fixed walking beam 61.

The sheath 63 is adapted to protecting the telescopic walking beam 62 from being invaded by foreign matters, buffering the impulse of the telescopic walking beam 62, eliminating the impact load, reducing the impact stress and improving the service life.

The excavator lower part length regulating system provided by this embodiment, provides the telescopic walking beam 62 which performs telescopic movement relative to the fixed walking beam 61 under the driving of the regulating assembly 50, to regulate the length of the lower part and reduce the ground pressure for ensuring stability.

In an embodiment, the regulating assembly 50 includes:
a telescopic rod 52, adapted to performing telescopic movement along a first direction;
a sliding rod 55, provided along a second direction, and an included angle A is formed between the sliding rod 55 and the first direction, where the A>0°;
a sliding block 54, sleeved on the sliding rod 55 and adapted to sliding along the second direction; and
a connecting rod 53, where an end of the connecting rod 53 is hinged with the telescopic rod 52 and another end of the connecting rod 53 is hinged with the sliding block 54,
where the telescopic rod 52 is adapted to driving the sliding block 54 to descend along the second direction through the connecting rod 53 when performing extending movement along the first direction; and is adapted to driving the sliding block 54 to ascend along the second direction through the connecting rod 53 when performing contracting movement along the first direction.

It should be noted that the first direction refers to the axis direction of the telescopic rod 52, and the second direction refers to the direction perpendicular to the contact surface between the caterpillar track 10 and the ground.

Figure 3:
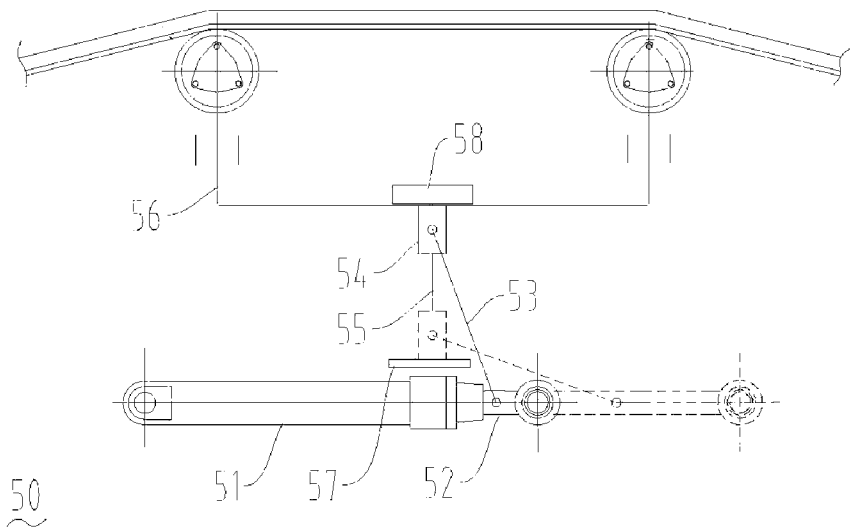
FIG. 3 is a schematic diagram of a regulating assembly.
Figure 4:
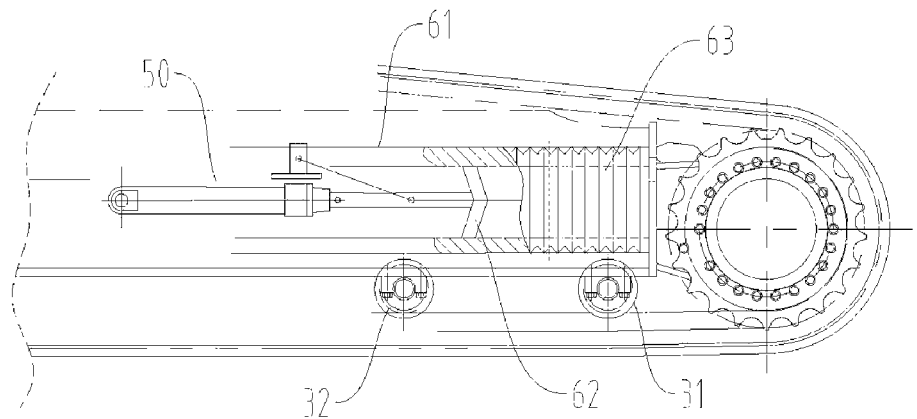
FIG. 4 is a schematic diagram of a cooperation state between a fixed walking beam and a telescopic walking beam.
Figure 5:
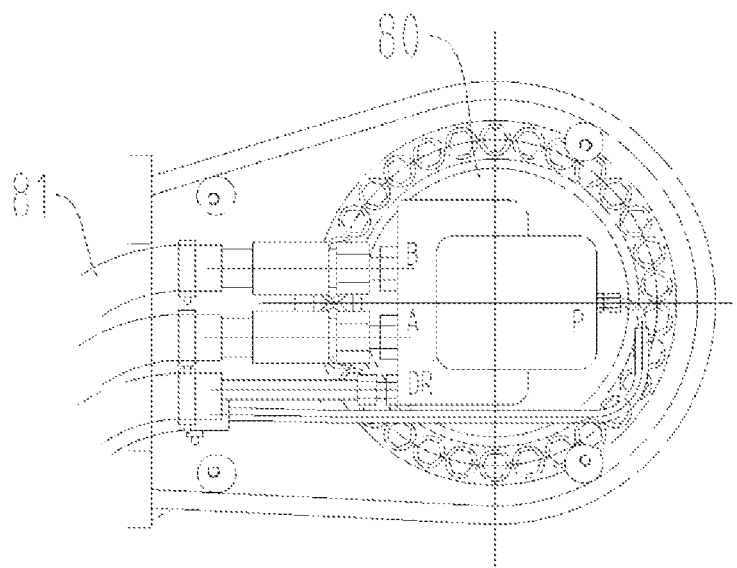
FIG. 5 is a schematic diagram of a walking motor and a pipeline.
Figure 6:
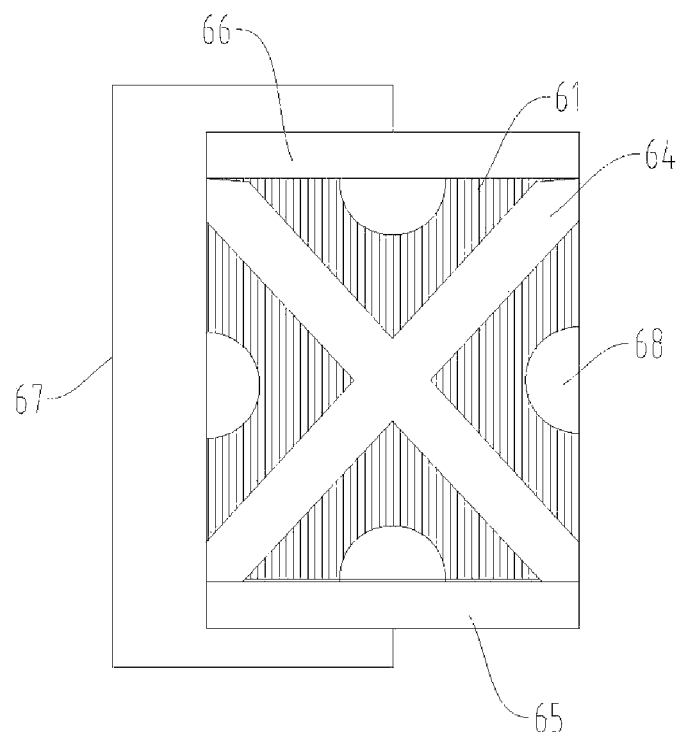
FIG. 6 is a schematic diagram of a section of a fixed walking beam.
Figure 7:
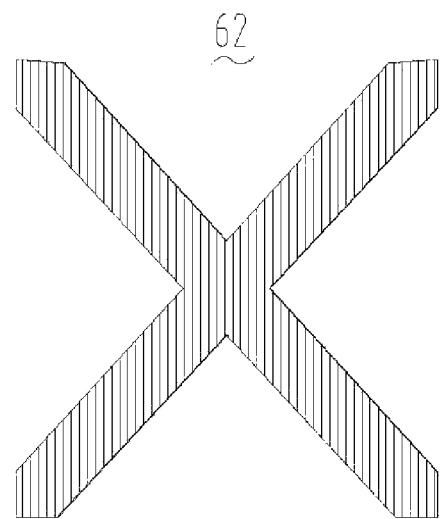
FIG. 7 is a schematic diagram of a section of a telescopic walking beam.
Figure 8:
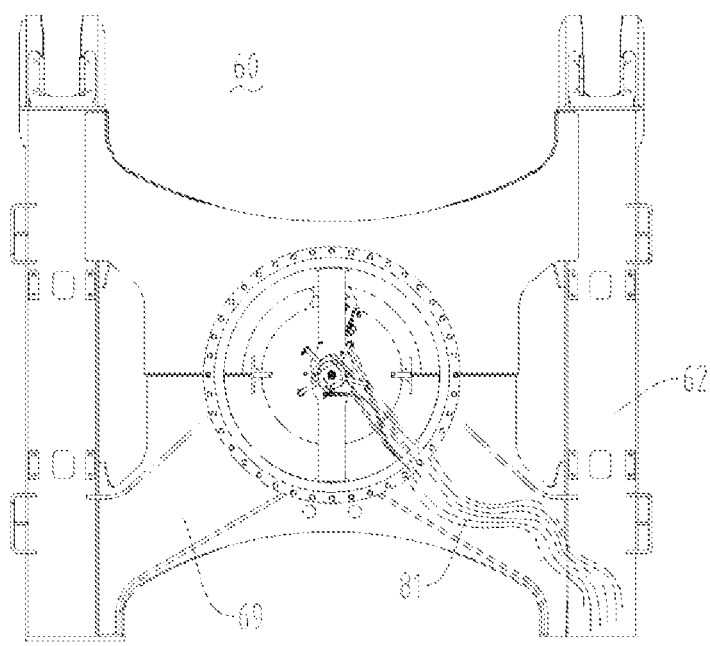
FIG. 8 is a top view of a lower part frame.

Referring to FIG. 3, when the regulating assembly 50 is in the extension state, the telescopic rod 52 performs extending movement along the first direction, the connecting rod 53 hinged with the telescopic rod 52 moves accordingly, the included angle between the connecting rod 53 and the first direction decreases, the length of the connecting rod 53 remains unchanged, and the end of the connecting rod 53 hinged with the sliding block 54 moves down along the second direction, thus driving the sliding block 54 to move down along the second direction. When the regulating assembly 50 is in the construction state, the telescopic rod 52 performs contracting movement along the first direction, the included angle between the connecting rod 53 and the first direction increases, and the end of the connecting rod 53 hinged with the sliding block 54 moves up along the second direction, thus driving the sliding block 54 to move up along the second direction.

In an embodiment, the included angle A between the sliding rod 55 and the first direction is preferred 90°. In addition, the sliding rod 55 is perpendicular to the first direction, and the sliding block 54 is adapted to moving along the second direction and perpendicular to the first direction. The lifting height of the carrier wheel 40 is equal to the distance that the sliding block 54 moves along the sliding rod 55.

When the included angle A between the sliding rod 55 and the first direction is not equal to 90°, the lifting height of the carrier wheel 40 is less than the distance that the sliding block 54 moves along the sliding rod 55.

In an embodiment, the regulating assembly 50 further includes:
a following rod 56, fixedly connected to the sliding block 54, and adapted to following the lifting of the sliding block 54 to perform lifting movement,
where an end of the following rod 56 is connected to the carrier wheel 40, and the carrier wheel 40 is adapted to holding the caterpillar track 10.

When the regulating assembly 50 is in the extension state, the contact length between the caterpillar track 10 and the ground increases, the sliding block 54 moves down along the second direction, the following rod 56 moves down with the sliding block 54, the carrier wheel 40 also moves down, and a portion of the caterpillar track 10 held by the carrier wheel 40 moves down accordingly, thereby increasing the length of the contact portion between the caterpillar track 10 and the ground. When the regulating assembly 50 is in the contraction state, the sliding block 54 moves up along the second direction, the following rod 56 moves up with the sliding block 54, the carrier wheel 40 also moves up, and the portion of the caterpillar track 10 held by the carrier wheel 40 moves up accordingly, thereby decreasing the length of the contact length between the caterpillar track 10 and the ground. That is, an adaptive regulation of the caterpillar track 10 with a constant perimeter is realized.

In an embodiment, the regulating assembly 50 further includes: an upper limiting portion 58, provided at an upper end of the sliding rod 55 along the second direction, and adapted to limiting the rising movement of the sliding block 54 along the second direction, and preventing that the position of the caterpillar track 10 held by the carrier wheel 40 is too high to interfere the platform of the excavator, which is caused by a too high position of the sliding block 54; and
a lower limiting portion 57, provided at a lower end of the sliding rod 55 along the second direction, and adapted to limiting the falling movement of the sliding block 54 along the second direction, and preventing that the carrier wheel 40 cannot hold up the caterpillar track 10, which is caused by a too low position of the sliding block 54.

The excavator lower part length regulating system provided by this embodiment, provides the following rod 56 of the regulating assembly 50 whose end is connected with the carrier wheel 40 for holding the caterpillar track 10, to support the caterpillar track 10 along longitudinal direction, and regulate the caterpillar track 10 to ascend or descend along the longitudinal direction when the following rod 56 is performing lifting movement following the lifting movement of the sliding block 54, to ensure that the caterpillar track 10 is always in a tension state, and realize that the adaptive regulation of the caterpillar track 10 with a constant perimeter.

As a kind of deformation, the regulation of up and down for the carrier wheel 40 by the regulating assembly 50 is canceled, and an oil cylinder is provided to directly drive the carrier wheel 40 to move up and down, and the oil cylinder supplies oil separately to regulate the height of the carrier wheel 40.

In an embodiment, the telescopic rod 52 is fixedly connected to or hinged with the telescopic walking beam 62; and the telescopic rod 52 moves along the first direction, and then is adapted to driving the telescopic walking beam 62 to perform telescopic movement relative to the fixed walking beam 61.

In an embodiment, the regulating assembly 50 further includes: a telescopic cylinder 51 provided in the lower part walking beam, and adapted to connecting to the telescopic rod 52 and driving the telescopic rod 52 to perform telescopic movement.

The telescopic cylinder 51 drives the telescopic rod 52 to perform telescopic movement, to drive the telescopic walking beam 62 to perform telescopic movement along the first direction relative to the fixed walking beam 61, and realize the regulation for the length of the excavator lower part. In addition, the telescopic movement of the telescopic rod 52 drives the up and down movement of the carrier wheel 40, to realize the adaptive regulation of the caterpillar track 10 with a constant perimeter.

In an embodiment, the excavator lower part length regulating system further includes: a following supporting wheel 31, connected to the telescopic walking beam 62 and adapted to moving with the movement of the telescopic walking beam 62.

The excavator lower part length regulating system provided by this embodiment, provides the following supporting wheel 31 to move with the movement of the telescopic walking beam 62, to make the following supporting wheel 31 move along when a driving wheel is shifted after the length of the lower part is increased, to ensure the tension of a part below the driving wheel 20 and the caterpillar track 10.

In an embodiment, the excavator lower part length regulating system further includes: a fixed supporting wheel 32, connected to the fixed walking beam 61 and adapted to supporting the fixed walking beam 61.

In an embodiment, the fixed walking beam 61 is provided with at least one pipeline channel 68 on a section perpendicular to its length direction, and the pipeline channel 68 is adapted to arranging a pipeline 81.

In an embodiment, the excavator lower part length regulating system further includes: a walking motor 80, adapted to driving the driving wheel 20 to move.

In an embodiment, four pipelines are required by the walking motor 80 for connecting, and the pipeline channel 68 provided on the fixed walking beam 61 is adapted to arranging the four pipelines connected to the walking motor 80.

In an embodiment, the number of the pipeline channels 68 is four, which are respectively provided on four surfaces of the fixed walking beam 61 along the length direction. The four pipelines connected to the walking motor 80 are respectively arranged in the four pipeline channels 68.

The excavator lower part length regulating system provided by this embodiment, provides the fixed walking beam 61 with at least one pipeline channel 68 provided on the section perpendicular to its length direction, to reasonably arrange one or more pipelines for preventing the pipelines from wear during operating, and ensuring the cleanliness of overall appearance.

In an embodiment, inside of the fixed walking beam 61 is provided with a telescopic cavity 64, and the telescopic cavity 64 is matched with the shape of the telescopic walking beam 62 and is adapted to guiding the movement of the telescopic walking beam 62; and the section of the telescopic walking beam is X-shaped or cross-shaped.

In an embodiment, the section of the telescopic walking beam is X-shaped or cross-shaped, and is preferred X-shaped, whose main advantage is high bearing capacity.

In an embodiment, an upper end and a lower end of the fixed walking beam 61 are provided with an upper lubrication passage 66 and a lower lubrication passage 65 respectively. The upper lubrication passage 66 is communicated with an upper part of the telescopic cavity 64, and the lower lubrication passage 65 is communicated with a lower part of the telescopic cavity 64. The upper lubrication passage 66 and the lower lubrication passage 65 are communicated through a lubrication pipe 67.

The lubricating passage is provided with lubricating oil, preferred grease, which can reduce the wear of the moving surface and prevent noise.

The excavator lower part length regulating system provided by this embodiment, provides the upper end and the lower end of the fixed walking beam 61 with the upper lubrication passage 66 and the lower lubrication passage 65 respectively, and the upper lubrication passage 66 and the lower lubrication passage 65 are communicated through a lubrication pipe 67, to extrude a grease through a X sliding rod 55. Since most of the grease deposited below due to gravity is squeezed to an upper part from a bottom of the channel, and returns to the upper part for lubrication, a cycle is formed to ensure good lubrication in the channel.

In an embodiment, the upper lubricating passage 66 and the lower lubricating passage 65 of the fixed walking beam 61 are changed into a closed oil passage, the lubricating pipe 67 is cancelled, and the oil passage is used for oil supply.

In an embodiment, the excavator lower part length regulating system further includes: a main bracket 69, provided in X shape and adapted to connecting two fixed walking beams 61.

In an embodiment, in order to adapt to the extension of the length of the lower part, an appropriate extension of the pipeline 81 is required, and the extended pipeline 81 is adapted to arranging in the main bracket 69.

Embodiment Two

Referring to FIG. 1 to FIG. 8, this embodiment provides an excavator, including:

a rotating platform, an operating room, a working arm, and a lower part frame 60; and the above-mentioned excavator lower part length regulating system provided on the lower part frame 60.

The excavator provided by this embodiment, provides the excavator lower part length regulating system to regulate the length of the lower part, and overcomes the defect that the traditional excavator fails to regulate the ground pressure by regulating the length of lower part; and provides the excavator capable of regulating the ground pressure according to the requirements to increase the stability of the excavator during working.

It should be noted that the above embodiments are only examples for clear description, and are not limitations of the embodiments. For those skilled in the art, other different forms of modifications or replacements may be made on the basis of the above description. It is not necessary and cannot be exhaustive to show all embodiments. These modifications or replacements do not make the essence of the corresponding solutions depart from the scope of the solutions of various embodiments of the present application.

What is claimed is:

1. An excavator lower part length regulating system, comprising:
   a lower part walking beam;
   a caterpillar track, provided around the lower part walking beam; and a regulating assembly, adapted to regulating the length of the lower part walking beam and concomitantly regulating the height of the caterpillar track along a longitudinal direction, wherein the regulating assembly has an extension state in which the lower part walking beam is driven to be elongated and the caterpillar track is driven to descend along the longitudinal direction, and a contraction state in which the lower part walking beam is driven to be shortened and the caterpillar track is driven to ascend along the longitudinal direction, wherein the lower part walking beam comprises:

a fixed walking beam; and a telescopic walking beam sleeved and connected to the fixed walking beam;

wherein the telescopic walking beam is adapted to performing telescopic movement relative to the fixed walking beam under a driving of the regulating assembly, wherein the fixed walking beam is provided with at least one pipeline channel on a section perpendicular to a length direction of the fixed walking beam, and the pipeline channel is adapted to arranging a pipeline, wherein inside of the fixed walking beam is provided with a telescopic cavity, and the telescopic cavity is matched with the shape of the telescopic walking beam and is adapted to guiding the movement of the telescopic walking beam; and the section of the telescopic walking beam is X-shaped or cross-shaped.

2. The excavator lower part length regulating system according to claim 1, wherein the regulating assembly comprises:

a telescopic rod, adapted to performing telescopic movement along a first direction;

a sliding rod, provided along a second direction, and an included angle A is formed between the sliding rod and the first direction, wherein the A>0°;

a sliding block, sleeved on the sliding rod and adapted to sliding along the second direction; and a connecting rod, wherein an end of the connecting rod is hinged with the telescopic rod and another end of the connecting rod is hinged with the sliding block;

wherein the telescopic rod is adapted to driving the sliding block to descend along the second direction through the connecting rod when the telescopic rod performs extending movement along the first direction; and the telescopic rod is adapted to driving the sliding block to ascend along the second direction through the connecting rod when the telescopic rod performs contracting movement along the first direction.

3. The excavator lower part length regulating system according to claim 2, wherein the regulating assembly further comprises:

a following rod, fixedly connected to the sliding block, and adapted to following the lifting of the sliding block to perform lifting movement;

wherein an end of the following rod is connected to a carrier wheel, and the carrier wheel is adapted to holding the caterpillar track.

4. The excavator lower part length regulating system according to claim 3, wherein the telescopic rod is fixedly connected to or hinged with the telescopic walking beam; and the telescopic rod moving along the first direction is adapted to driving the telescopic walking beam to perform telescopic movement relative to the fixed walking beam.

5. The excavator lower part length regulating system according to claim 1, further comprising: a following supporting wheel connected to the telescopic walking beam and adapted to moving with the movement of the telescopic walking beam.

6. The excavator lower part length regulating system according to claim 1, wherein an upper end and a lower end of the fixed walking beam are provided with an upper lubrication passage and a lower lubrication passage respectively, wherein the upper lubrication passage is communicated with an upper part of the telescopic cavity, the lower lubrication passage is communicated with a lower part of the telescopic cavity, and the upper lubrication passage and the lower lubrication passage are communicated through a lubrication pipe.

7. An excavator, comprising: a rotating platform, an operating room, a working arm, and a lower part frame; and an excavator lower part length regulating system of claim 1 provided on the lower part frame.

\* \* \* \* \*